United States Patent [19]

Oswald et al.

[11] Patent Number: 4,685,527
[45] Date of Patent: Aug. 11, 1987

[54] SYSTEM FOR POWERING A TRAILER

[75] Inventors: Norman D. Oswald, Duncanville; Harry S. Mankey, Dallas; Robert R. Dean; Dennis W. Hudler, both of Duncanville, all of Tex.

[73] Assignee: Standard Manufacturing Co., Inc., Dallas, Tex.

[21] Appl. No.: 772,778

[22] Filed: Sep. 5, 1985

[51] Int. Cl.⁴ .............................................. B62D 59/04
[52] U.S. Cl. .................................. 180/14.3; 180/14.2; 180/24.07
[58] Field of Search .................... 180/14.1, 14.2, 14.3, 180/14.6, 14.7, 21, 24.06, 24.07; 152/416, 417

[56] References Cited

U.S. PATENT DOCUMENTS

| 3,360,064 | 12/1967 | Budzich | 180/14.3 |
| 3,446,175 | 5/1969 | Boehler | 180/14.3 |
| 3,584,698 | 6/1971 | Larson | 180/14.3 |
| 3,828,875 | 8/1974 | Tarter | 180/14.3 |
| 3,981,374 | 9/1976 | Johns | 180/14.3 |
| 3,994,353 | 11/1976 | Greene | 180/14.3 |
| 4,027,738 | 6/1977 | Lundin | 180/14.3 |
| 4,082,157 | 4/1978 | Sternberg | 180/14.3 |
| 4,470,506 | 9/1984 | Goodell | 152/416 |

Primary Examiner—John J. Love
Assistant Examiner—Donn McGiehan
Attorney, Agent, or Firm—Michael A. O'Neil

[57] ABSTRACT

The present invention is a system for powering a trailer. The system includes a trailer having a tongue for connecting the trailer to a towing vehicle. The trailer is supported by at least one wheel mounted on each of opposing sides of the trailer frame. Mounted on the trailer is a motor for driving the trailer wheels. Power is supplied to the motor from the towing vehicle.

12 Claims, 7 Drawing Figures

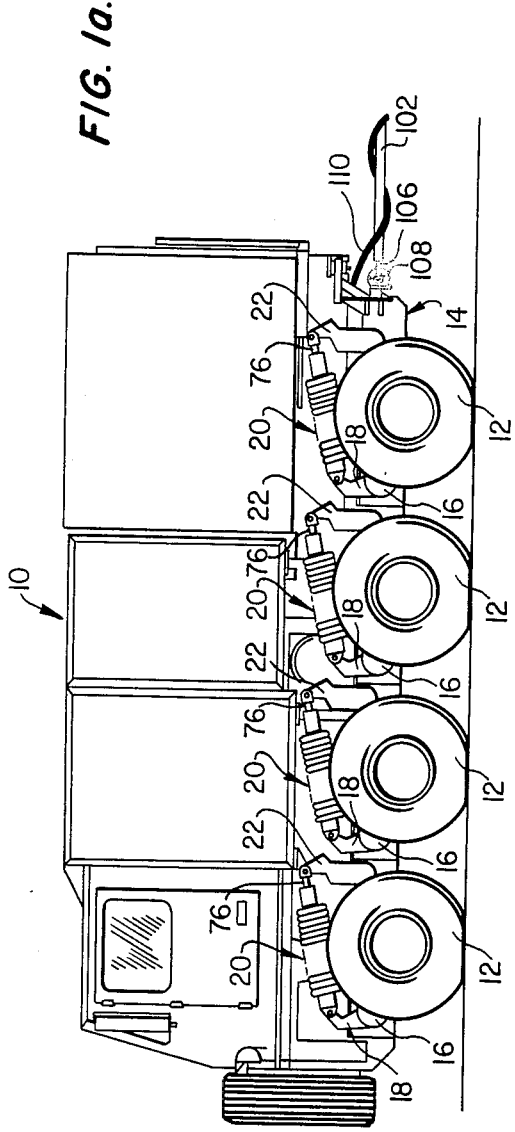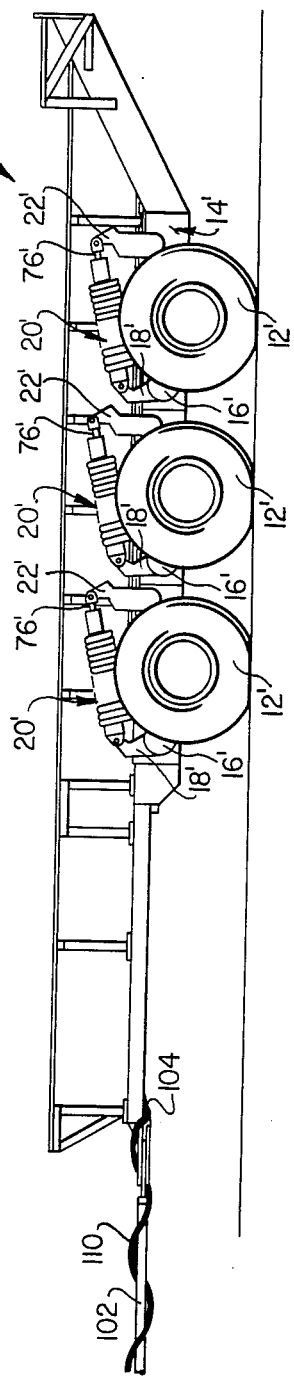

SYSTEM FOR POWERING A TRAILER

TECHNICAL FIELD

This invention relates to vehicular trailers, and more particularly to a system for selectively powering a trailer to reduce the load imposed on a vehicle towing the trailer.

BACKGROUND AND SUMMARY OF THE INVENTION

Trailers have been used over the years to supplement the carrying capacity of many different types of vehicles. Typically, trailers include a frame which is supported by one or more wheels on opposing sides of the trailer. The number of wheels used to support the trailer frame varies according to the load which must be carried out by the trailer, the trailer's length and the stability required for the particular application, and may require from one to as many as four or five wheels on either side of the trailer to provide adequate support.

Although a trailer can be an effective means of increasing the load capacity of a vehicle, the use of a trailer may hinder numerous performance characteristics of the towing vehicle. This is primarily due to the fact that the towing vehicle must provide driving power and traction for itself and the increased load caused by trailer drag. For example, the towing vehicle will often experience a loss of traction or will not provide sufficient power to pull the trailer up moderate to steep grades. When operating over adverse terrain, the towing vehicle will often experience a pushing and pulling effect as the trailer climbs over and descends small hills or passes over obstacles, causing a reduction in control of the towing vehicle and discomfort to its operators and passengers. Similarly, towing over soft surfaces, such as mud, gravel or sand, causes a substantial increase in load to both the towing vehicle and the trailer so that in many cases transport will become impossible. Of course, any combination of the foregoing adverse conditions, as is often the case, will hinder performance of the towing vehicle still further.

Additional problems associated with towing of trailers are experienced by vehicles designed for use over adverse terrain. Such vehicles often utilize either a plurality of wheels or a track to support the opposite sides of the vehicle. The wheels or the tracts on each side of the vehicle are driven independently to allow the vehicle to be maneuvered by skid steering. Such vehicles experience increased drag during turning due to lateral sliding of their wheels or tracks over the underlying surface as the vehicle pivots. Drag imposed by a trailer hinders such pivoting of the vehicle, resulting in reduced maneuverability. This is particularly true when the trailer utilizes two or more wheels on each side thereof. In this circumstance, the trailer imposes additional drag during turning caused by lateral sliding of its front and rear wheels over the underlying surface in a manner similar to skid steering of the towing vehicle.

The present invention provides a control system for powering a trailer which eliminates many of the foregoing and other problems associated with conventional trailers. The system includes one or more hydraulic motors mounted on a trailer frame for driving one or more wheels mounted on opposing sides of the trailer. Pressurized hydraulic fluid supplied to the hydraulic motors on the trailer from a hydraulic pump on the towing vehicle selectively powers the trailer thereby reducing the drag imposed on the towing vehicle.

In one aspect of the invention, at least two hydraulic motors are used, each for driving one or more wheel members on opposing sides of the trailer. The hydraulic motors are supplied with pressurized hydraulic fluid in parallel from a common supply line, such that the speed of the motor associated with the inward side of the trailer will decrease and the speed of hydraulic motor associated with the outward side of the trailer will increase during turning. This feature reduces drag associated with pivoting the trailer on a centrally located axis.

In another aspect of the invention, the hydraulic pump on the towing vehicle is a variable displacement hydraulic pump. Displacement control apparatus is provided for varying the displacement of the hydraulic pump to maintain the hydraulic fluid supplied to the hydraulic motors at a predetermined pressure. This feature allows the speed of the trailer to vary during towing without a corresponding variance in the driving force generated by the hydraulic motors.

In yet another aspect of the present invention, pressure control apparatus is included for varying the pressure of the hydraulic fluids supplied to the hydraulic motors.

In still another aspect of the present invention, the hydraulic pump may be mounted within a command vehicle which tows the trailer. Structure is provided within the trailer for providing pressurized hydraulic fluid from the hydraulic pump to the hydraulic motors. This feature increases serviceability of the system.

In yet another aspect of the present invention, wheel member positioning structure is provided for varying the vertical positioning of the trailer wheels with respect to the trailer frame. This feature allows a variance in the overall height of the trailer, thereby facilitating loading and unloading of its load. In addition, this feature allows vertical positioning of the wheels to distribute the trailer load in a manner facilitating turning of the trailer.

BRIEF DESCRIPTION OF THE DRAWINGS

A more complete understanding of the invention may be had by reference to the following Detailed Description when taken in conjunction with the accompanying Drawings, wherein:

FIG. 1a is a side view of a command vehicle incorporating the present invention;

FIG. 1b is a side view of a trailer incorporating the present invention;

FIG. 2a is a schematic illustration of those elements of the hydraulic system of the present invention located in the command vehicle shown in FIG. 1a;

DETAILED DESCRIPTION

Figure 2A:
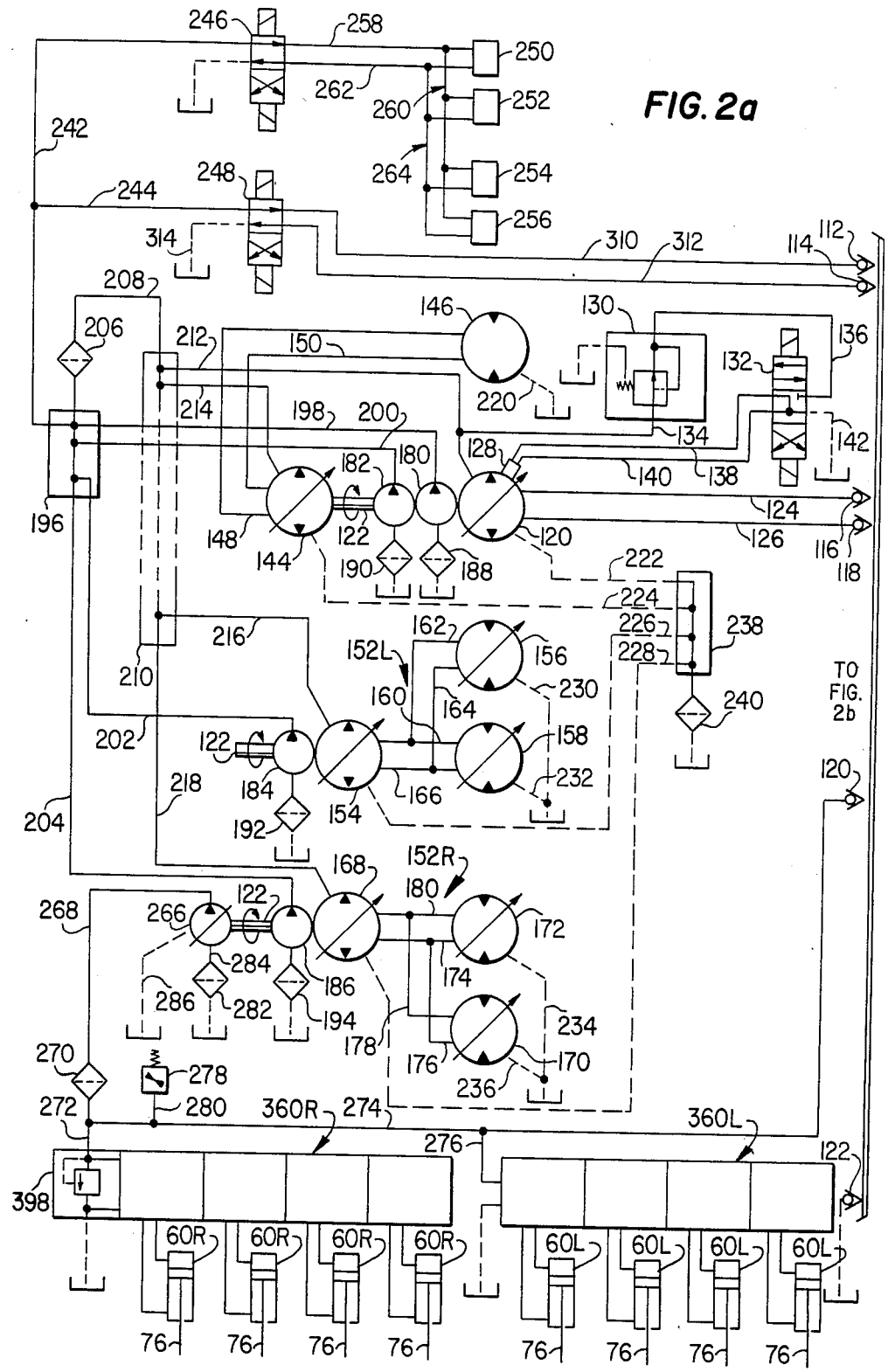

Referring now to the Drawings, and particularly to FIG. 1 thereof, there is shown a command vehicle 10 incorporating the present invention. The vehicle 10 includes a prime mover (not shown) which may comprise a carburetor/ignition engine, a diesel engine, a gas turbine, etc. The prime mover drives at least two pumps which are each mounted within the vehicle 10 and associated with opposing sides thereof. The hydraulic pumps each supply pressurized hydraulic fluid to two hydraulic motors for driving one or more of the wheel members mounted on that side of the vehicle 10. Any number of suitable transmissions may be utilized, such as a chain and sprocket drive, for driving at least one wheel member each side of the vehicle 10. Preferably, the hydraulic motors and pumps utilized in the vehicle 10 have variable displacements, thereby affording a wide range of control over the operating speed and power output of the pumps and motors during operation of the vehicle.

Wheel members 12 of the vehicle 10 are each mounted on a primary frame 14 by a secondary frame 16. The secondary frames 16 are pivotly mounted to the primary frame 14 of the vehicle 10, thereby allowing vertical movement of each of the wheel members 12 with respect to the frame 14. The wheel members 12 preferably comprise elastomeric tires, although other types of wheels and/or tires may be utilized in the practice of the invention, if desired. Although the embodiment illustrated in FIG. 1a includes four wheel members 12 mounted on each side of vehicle 10 and each supported by a secondary frame 16 for vertical movement with respect to the primary frame 14, it will be understood that the precise number of secondary frames and wheel members utilized is not critical to the practice of the invention. Accordingly, many aspects of the invention may be incorporated with vehicles having as few as two wheel members, or as many as five or more wheel members mounted on each side thereof.

Each secondary frame 16 has a bracket 18 secured thereto. A suspension assemby 20 is connected between each bracket 18 and a corresponding bracket 22 secured to the primary frame 14. A detailed disclosure of the construction and operation of each of the suspension assemblies 20 is provided by co-pending application Ser. No. 747,669, filed June 21, 1985, which disclosure is incorporated herein by reference.

Each of the suspension assemblies 20 includes a piston rod 76 which may be extended or retracted to vary the length of the suspension assemby. Extension and retraction of the piston rods 76 of the suspension assemblies 20 may be utilized to vary the height of the primary frame 14 above the underlying surface and/or to vary the load supported by particular wheel members 12. For example, simultaneous extension of the piston rods 76 of each of the assemblies 20 of the vehicle 10 allows the bracket 18 attached to each assembly to be displaced from the corresponding bracket 22 mounted on the primary frame 14. This causes counter-clockwise pivoting of the secondary frames 16, resulting in lowering of the primary frame 14 toward the underlying surface. Individual adjustment of the piston rod 76 of a particular assembly 20 may be completed to vary the load supported by a wheel member 12 on either side of the vehicle 10.

Referring now to FIG. 1b, there is shown a trailer 100 which is used with the command vehicle 10. The trailer 100 incorporates numerous component parts in the suspension thereof which are substantially indentical in construction and operation to the component parts of the command vehicle 10 illustrated in FIG. 1a. Such identical component parts are designated in FIG. 1b with the same reference numerals utilized in the description of the command vehicle 10 (of FIG. 1a), but are differentiated therefrom by means of a prime (') designation.

The trailer 100 is used to supplement the load carrying capacity of the command vehicle 10. The trailer 100 is mechanically connected to the command vehicle 10 by means of a tongue 102 which is pivotally mounted to the front of the trailer by means of a hinge 104. The tongue 102 includes a hook 106 (shown in FIG. 1a) mounted on the end thereof. The hook 106 is secured to a hitch 108 mounted on the rear end of the vehicle 10.

The trailer 100 includes hydraulic motors (not shown in FIG. 1b) for driving at least one of the wheel members 12' on either side of the trailer. The hydraulic motors are powered by pressurized hydraulic fluid received from the command vehicle 10. The incorporation of hydraulic motors to drive the trailer 100 greatly reduces, if not substantially eliminates, the drag imparted to a vehicle 10 during operation over a wide variety of surface conditions.

The suspension assemblies 20' of the trailer 100 can be actuated similarly to the suspension assemblies 20 of the command vehicle 10 to raise and lower the trailer 100 and/or to vary the load supported by each of the wheel members 12', thereby facilitating loading and unloading of the trailer 100 and turning of the trailer 100. Pressurized hydraulic fluid for the operation of the suspension assemblies 20' is also supplied from the command vehicle 10.

A control linkage 10, comprising electrical, hydraulic and pneumatic lines, is used to electrically hydraulically and pneumatically connect the command vehicle 10 with the trailer 100. The lines comprising the control linkage 110 are equipped with suitable fittings (not shown) to allow their connection and disconnection to and from corresponding couplings (not shown) mounted on the rear of the command vehicle 10. The control linkages shown in FIGS. 1a and 1b are wrapped around the tongue 102 of the trailer; however, other suitable means for supporting the control linkage 110 above the underlying surface may be utilized, if desired.

Figure 2B:
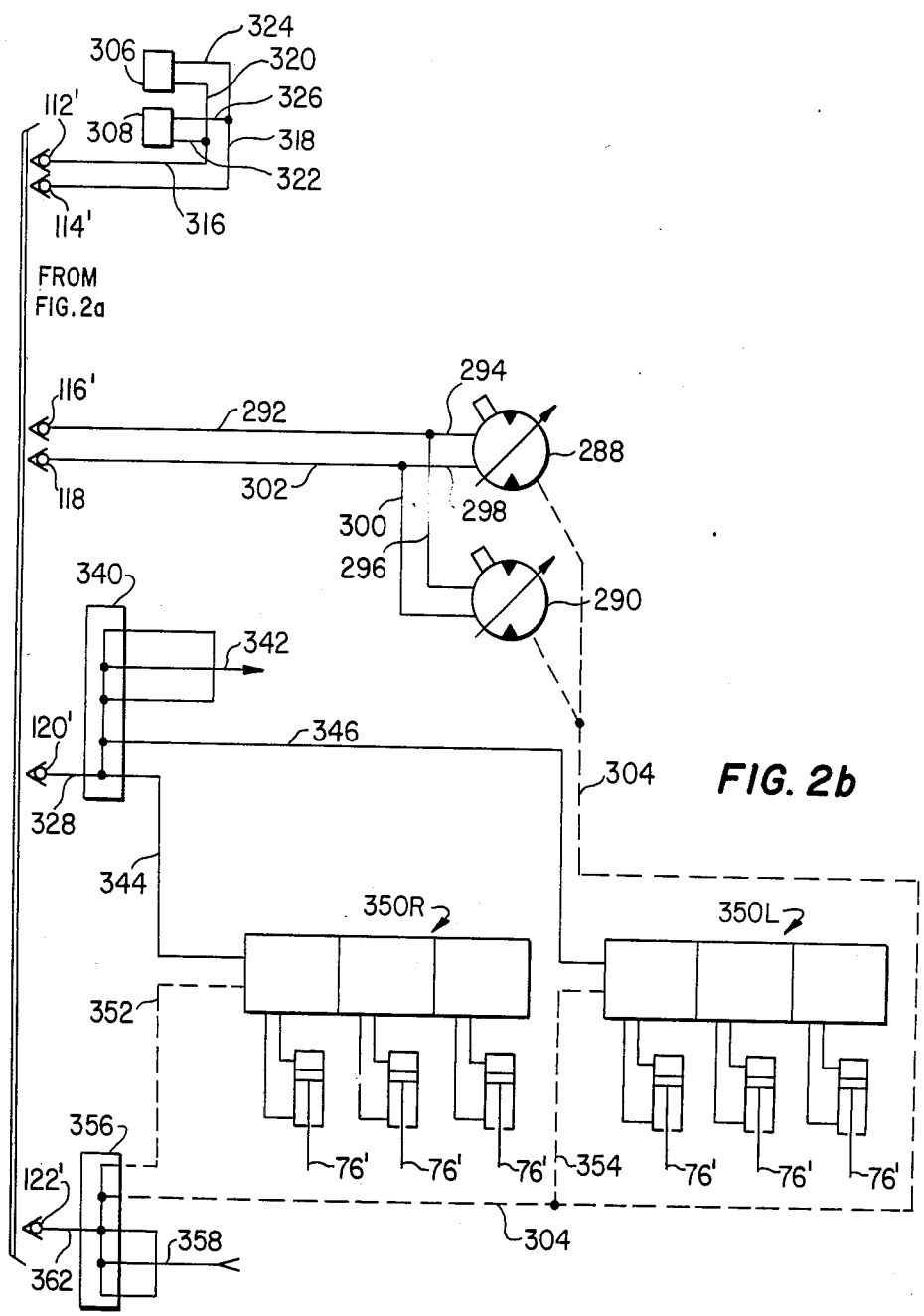
FIG. 2b is a schematic illustration of these elements of the hydraulic system of the present invention located in the trailer shown in FIG. 1b.

FIGS. 2a and 2b schematically illustrate the hydraulic system of the command vehicle 10 and the trailer 100. Specifically, all components illustrated in FIG. 2a are mounted on the command vehicle 10, while all components illustrated in FIG. 2b are mounted on the trailer 100. A number of hydraulic lines of the hydraulic system shown in FIG. 2a are connected to the hydraulic system of FIG. 2b through releaseable couplings 112 through 122 which mate with corresponding couplings 112' through 122' of FIG. 2b.

Pressurized hydraulic fluid is provided for operation of the hydraulic motors of the trailer 100 by a variable displacement pressure compensating pump 120. The pump 120 is driven by a prime mover 122, which also simultaneously drive all other pumps of the system shown in FIG. 2a. Pressurized hydraulic fluid is provided to the hydraulic motors of the trailer 100 from the discharge of the pump 120 via a line 124. Hydraulic fluid discharged from the hydraulic motors means of the trailer 100 is returned to the inlet side of the pump 120 via a line 126.

The discharge pressure of the pump 120 is maintained relatively constant by a controller 128 which senses the discharge pressure of the pump 120. The controller 128 also varies the displacement of the pump 120 to maintain a relatively constant discharge pressure in line 124. Thus, controller 128 adjusts the displacement of the pump 120 to compensate for varying conditions in the hydraulic motors of the trailer 100 and for variations of the speed of the prime mover 122 to maintain a relatively constant discharge pressure.

Operation of the controller 128 is varied by means of a pressure regulator 130 and a 3-position solenoid-actuated valve 132. The pressure regulator 130 receives pressurized hydraulic fluid from various charge pumps of the system shown in FIG. 2a via a line 134. The pressure regulator 130 is preferably mounted on a control panel within the cab of the vehicle 10 to allow its adjustment by the vehicle operator. The pressure regulator 130 supplies hydraulic pressure to the valve 132 via a line 136.

The valve 132 is connected to the controller 128 through lines 138 and 140 and is used to control forward, reverse and neutral operating modes of the pump 120. When positioned as shown in FIG. 2a, the pump 120 is placed in its neutral operating mode by discharging the pressure in lines 138 and 140 through a drain line 142. When the valve 132 is placed in either of the two alternative positions shown, one of the lines 138 and 140 is pressurized through its connection with the pressure regulator 130 through the line 136, while venting the other of lines 138 and 140 to the drain line 142, thus shifting the pump 120 into forward and reverse operating modes, respectively.

The controller 128 varies the displacement of the pump 120 to maintain a discharge pressure which corresponds to the pressure applied to the controller 128 through lines 138 and 140. Accordingly, variation of the pressure regulator 130 when the valve 132 is placed in the forward or reverse operating positions will vary the discharge pressure of the pump 120 maintained by the controller 128. Therefore, the pressure regulator is used as a convenient means for the operator of the vehicle 10 to vary the discharge pressure of the pump 120 during forward and reverse operating modes.

The prime mover 122 also drives a variable displacement hydraulic pump 144. The pump 144 supplies pressurized hydraulic fluid to a fixed displacement motor 146 via a line 148. Hydraulic fluid discharged from the motor 146 is returned to the pump 144 via a line 150. The motor 146 is connected to an electric generator (not shown), which provides electrical power for various electrical systems of the command vehicle 10 and the trailer 100. Therefore, it is necessary to maintain the speed of the motor 146 relatively constant. This is accomplished by providing a sensor (not shown) for detecting the speed of the motor 146 and a controller (not shown) for varying the displacement of the pump 144 to maintain the motor 146 at a constant speed.

The command vehicle 10 is driven by two hydrostatic drive systems 152L and 152R, which are driven by the prime mover 122. The drive system 152L drives the wheel members 12 on the left side of the command vehicle 10 while the drive system 152R drives the wheel members 12 on the right side of the command vehicle 10. The operation of the drive systems 152L and 152R may be controlled independently to allow skid steering and counter-rotation of the command vehicle 10.

The drive system 152L includes a variable displacement hydraulic pump 154 which supplies pressurized hydraulic fluid to a pair of variable displacement motors 156 and 158 via lines 160 and 162. Hydraulic fluid discharge from the motors 156 and 158 is returned to the pump 154 via lines 164 and 166. The motors 156 and 158 are thus hydraulically connected in parallel to the pump 154. The motors 156 and 158 also drive and are therefore interconnected by a common transmission which transmits torque to the wheel members 12 on the left side of the command vehicle 10. Therefore, the motors 156 and 158 operate at the same speed and are supplied with hydraulic fluid having the same pressure.

The drive system 152R includes a variable displacement hydraulic pump 168 which supplies pressurized hydraulic fluid to a pair of variable displacement motors 170 and 172 via lines 174 and 176. Hydraulic fluid discharged from the motors 170 and 172 is returned to the pump 168 via lines 178 and 180. The motors 170 and 172 are thus hydraulically connected in parallel to the pump 168. The motors 170 and 172 also drive and are therefore interconnected by a common transmission which transmits torque to the wheel members 12 on the left side of the command vehicle 10. Therefore, the motors 170 and 172 operate at the same speed and are supplied with hydraulic fluid having the same pressure.

The prime mover 122 also drives a number of charge pumps 180, 182, 184 and 186 which replenish hydraulic fluid spent during the operation of the pumps 120, 144, 154 and 168. The charge pumps 180, 182, 184 and 186 receive hydraulic fluid from a hydraulic fluid reservoir of the command vehicle 10 through hydraulic fluid filters 188, 190, 192 and 194, respectively. Hydraulic fluid is discharged from the charge pumps 180-186 to a manifold 196 via lines 198, 200, 202 and 204, respectively. Hydraulic fluid is then discharged from the manifold 196 through a filter 206 and a line 208 to a distribution manifold 210. Hydraulic fluid is in turn supplied from the distribution manifold 210 to the supply line 134 of the pressure regulator 130 via a line 212. Hydraulic fluid from line 212 also replaces hydraulic fluid spent during the operation of the pump 120 which services the trailer 100. Hydraulic fluid received by the distribution manifold 210 is also carried by lines 214, 216 and 218 to replace hydraulic fluid spent during the operation of pumps 144, 154 and 168, respectively. Drain lines 220, 222, 224, 226, 228, 230, 232, 234 and 236 return hydraulic fluid spent in the operation of the various pumps and motors with which they are associated to the reservoir of the hydraulic system of the command vehicle 10. Drain lines 222, 224, 226 and 228 direct spent hydraulic fluid from the pumps 120, 144, 154 and 168 to a discharge manifold 238. Fluid collected by the manifold 238 is first cleansed by a filter 240 before returning to the system reservoir.

Pressurized hydraulic fluid from the manifold 196 is supplied via lines 242 and 244 to a pair of two-position solenoid-actuated values 246 and 248. Valve 246 serves to control switching of gear boxes 250, 252, 254 and 256 between high and low speeds. Gear boxes 250 and 252 are associated with the hydraulic motors 156 and 158 on the left side of the command vehicle 10. Similarly, the gear boxes 154 and 256 are associated with the hydraulic pumps 170 and 172 on the right side of the command vehicle 10. The gear boxes 250 through 256 are connected to the gear box control valve 246 in parallel via a line 258 and associated manifold 260 and through a line 262 and an associated manifold 264. Thus, each of the gear boxes 250 through 256 is switched between its high and low speed positions simultaneously upon actuation of the gear box control valve 246. Actuation of the valve 246 alternates the lines 258 and 262 supplying the gear boxes 250 through 256 between two pressurized states to achieve the desired high or low speed gear ratio. The position of the gear box control valve 246 is controlled by means of a suitable switch, such as a toggle switch, mounted within the command vehicle 10 to allow its operation by the vehicle operator.

The hydraulic system of the command vehicle 10 also includes a variable displacement pressure compensating pump 266 for supplying pressurized hydraulic fluid to the hydraulic cylinders 60L and 60R of the suspension assemblies 20 of the command vehicle 10 to allow actuation of the piston rods 76. Pressurized hydraulic fluid discharged from the pump 266 is directed by a line and through a filter 270. Hydraulic fluid is directed from the filter 270 to a left suspension assembly control 360R via a line 272 into a left suspension assembly control 360L via lines 272, 274 and 276. The right suspension assembly control 360R and the left suspension assembly control 360L include components identical in structure and function to those of the left suspension assembly control 360L and right suspension assembly control 360R disclosed in FIG. 19 and the related discussion of co-pending application Ser. No. 747,669, which disclosure is incorporated herein by reference.

The right suspension assembly control 360R and the left suspension assembly control 360L serve to selectively supply pressurized hydraulic fluid to and to discharge hydraulic fluid from the respective hydraulic cylinders 60R and 60L to control actuation of each of the piston rods 76. This allows individual positioning of each of the piston rods 76 to lift and lower the command vehicle 10 and to adjust the load supported by each of the wheel members 12 to facilitate skid steering and stability of the vehicle 10. The right suspension assembly control 360R includes a pressure relief valve 398 which vents hydraulic pressure from lines 272, 274 and 276 in the event that the hydralic pressure supplied by the pump 266 exceeds a predetermined safe operating range.

A pressure switch 278 is provided to monitor the pressure fluctuations within the right cylinder assembly control 360R and left cylinder assembly control 360L. The pressure switch 278 is connected by a line 280 to the line 274, which will experience a temporary pressure drop as pressurized hydraulic fluid is applied by the right and left suspension assembly controls 360R and 360L to actuate the piston rods 76. The pressure switch 278 is tripped by the fluctuation in pressure within the line 274 as any of the piston rods 76 is actuated. Once any of the piston rods 76 is actuated to its fullest extent, either through its extension or retraction stroke, any attempted further actuation of the piston rod in the same direction will be in effective and will not result in a drop in pressure within the line 274. The pressure switch 278 is monitored by the control system of the command vehicle 10 as the wheel members 12 are vertically positioned to determine when each of the piston rods 76 is fully extended or retracted.

The pump 266 is a variable displacement pressure compensating pump which is set to maintain a discharge pressure in the line 268 at a relatively constant pressure of 2,000 psi. This is accomplished by a conventional internal control mechanism which varies the displacement of the pump to adjust the discharge pressure. Such variation of the displacement of the pump 266 compensates for demand of hydraulic fluid by the right and left suspension assembly controls 360R and 360L and for variation in the speed of the prime mover 122 during operation of the command vehicle 10. hydraulic fluid is supplied to the pump 266 through a filter 282 by a line 284 from the fluid reservoir of the command vehicle 10. A drain line 286 serves a case drain for the pump 266, returning hydraulic fluid to the fluid reservoir of the command vehicle 10.

Referring now to FIG. 2b, there is shown a schematic diagram of the hydraulic system and various components housed within the trailer 100. All components shown in FIG. 2b and housed within the trailer 100 are supplied with pressurized hydraulic fluid from the command vehicle 10. Therefore, the trailer 100 is provided with an umbilical assembly 110 (shown in FIGS. 1a and 1b) having couplings 112', 114', 116', 118', 120' and 122' which engage the couplings 112, 114, 116, 118, 120 and 122 (shown in FIG. 2a) of the command vehicle 10 to allow the supply and return of hydraulic fluid to and from the trailer 100. It will be apparent that the couplings of FIGS. 2a and 2b are joined as the linkage assembly 110 of the trailer 100 is connected to the command vehicle 10.

The trailer 100 is driven by a pair of two-positioned variable displacement motors 288 and 290. The motor 288 drives one or more of the wheel members 12' mounted on the left side of the trailer 100, while the motor 290 drives one or more of the wheel members 12' on the right side of the trailer 100. The pumps 288 and 290 are connected to their associated wheel members by a suitable transmission, such as a chain and sprocket drive. The pumps 288 and 290 are supplied with pressurized hydraulic from the pump 120 of the command vehicle 10 through a common line 292. Pressurized hydraulic fluid from line 292 is then supplied in parallel to the pumps 288 and 290 driving the trailer 100 through lines 294 and 296. Hydraulic fluid discharged from the pumps 288 and 290 is returned to the command vehicle 10 through lines 298, 300 and 302. Hydraulic fluid spent through operation of the pumps 288 and 290 is returned to the fluid reservoir of the command vehicle 10 through a drain line 304.

The pumps 288 and 290 switch between a predetermined maximum displacement and a predetermined minimum displacement, depending upon the pressure of hydraulic fluid supplied thereto from the pump 120 of the command vehicle 10. Specifically, when the pressure of hydraulic fluid in the line 292 exceeds 3,000 psi, conventional internal controls adjust the pumps 288 and 290 to their maximum displacements, thereby increasing the torque applied to the wheel members 12'. As the pressure of hydraulic fluid within the line 292 decreases below the set points of 3,000 psi, the internal controls of the pumps 288 and 290 adjust their displacements to a minimum position.

The arrangement of the pumps 288 and 290 facilitates turning of the trailer 100 by the command vehicle 10 and provides automatic control of the torque applied to the wheel members 12' during operation of the trailer 100. As the trailer 100 is directed through a turn, the speed of the wheel member 12' on the inside of the turn will tend to slow while the speed of the wheel members 12' on the outside of the turn will tend to increase. It will be apparent that the trailer 100 will resist turning by the command vehicle 10, creating additional drag and thus hindering the performance of both the command vehicle 10 and the trailer 100. This problem is virtually eliminated by supplying pressurized hydraulic fluid to each of the motors 288 and 290 of the trailer 100 in parallel for lines 294 and 296. This arrangement maintains essentially equal torque output by each of the motors 288 and 290 during turning of the trailer 100 by equalizing the pressure supplied to the motors. At the same time, the flow of hydraulic fluid to the motors 288 and 290 through lines 294 and 296 can vary, allowing a corresponding variance in the speed of the wheel members 12' of the trailer 100. Thus, when the trailer 100 is directed through a turn, the motors 288 and 290 will apply relatively constant driving force to the wheel members 12' while allowing a variation in the speed of the wheel members 12' resulting in decreased drag and increased operating efficiency of the trailer 100 and the command vehicle 10.

The transmission of the trailer 100 includes a pair of gear boxes 306 and 108 which control the transmission of torque to the wheel members 12'. Specifically, the gear box 306 controls the transmission of torque from the motor 288 to the wheel members 12' associated therewith on one side of the trailer 100. Similarly, the gear box 308 controls the transmission of torque from the motor 290 to the wheel members 12' on the opposite side of the trailer 100. The gear boxes 306 and 308 are switched between neutral and low speed operating modes by actuation of the valve 248 (shown in FIG. 2a) located in the command vehicle 10. Hydraulic pressure from line 244 is directed by the valve 248 into one of the lines 310 and 312 of the command vehicle 10 which service the trailer 100. When valve 248 is in the position shown in FIG. 2a, hydraulic pressure is directed to line 310 and is exhausted from line 312 via a drain line 314 connecting the valve 248 to the fluid reservoir of the command vehicle 10.

The gear boxes 306 and 308 of the trailer 100 are hydraulically connected to the lines 310 and 312 and ultimately to the valve 248 of the command vehicle 10 through lines 316 and 318 within the trailer 100. The gear boxes 306 and 308 are hydraulically connected to line 316 via lines 320 and 322 in parallel and to line 318 via lines 324 and 326 also in parallel. The valve 248 may be actuated by the operator of the command vehicle 10 by means of a suitable control, such as a toggle switch, to alternate the supply of hydraulic pressure to the lines 316 and 318 servicing the gear boxes 306 and 308. Due to their parallel connection to the lines 316 and 318, the gear boxes 306 and 308 can be switched simultaneously below low speed and neutral operating modes. In this manner, the wheel members 12' on opposing sides of the trailer will always be maintained in the same operating mode.

During towing of the trailer 100 by the command vehicle 10, the motors 288 and 290 of the trailer 100 are actuated by pressurized hydraulic fluid supplied by the pump 120 within the command vehicle 10. At the outset of the operation of the trailer 100, the pump 120 is normally placed in its neutral operating mode by positioning the valve 132 as is shown in FIG. 2a. In the neutral operating mode the pump 120 creates no pressure differential between the lines 124 and 126 which service the pumps 288 and 290 within the trailer 100. As the command vehicle 10 is driven forward, the valve 132 can be actuated by the vehicle operator to place the pump 120 in the forward operating mode to supply pressurized hydraulic fluid to the motors 288 and 290 via lines 124 and 292. The pressure of hydraulic fluid supplied by the pump 120 is maintained relatively constant through variation of the pump displacement by the controller 128. The supply of hydraulic fluid to the motors 288 and 290 of the trailer 100 provides a relatively constant torque to the wheel members 12' of the trailer 100. As the speed of the trailer 100 and the command vehicle 10 increases, for example, the controller 128 will increase the displacement of the pump 120 to maintain a relatively constant discharge pressure and resulting torque produced by the motors 288 and 290 of the trailer. In this manner, the motors 288 and 290 of the trailer 100 are utilized to compensate for the load or drag which would otherwise be imposed upon the command vehicle 10 while towing the trailer 100. It will be apparent that the supply of hydraulic fluid to the motors 288 and 290 by the pump 120 will maintain the load compensation at a relatively constant level.

The load compensation provided by the pump 120 and the motors 288 and 290 of the trailer 100 may be varied by the vehicle operator driving the command vehicle 10 to substantially eliminate drage during towing. This may be necessary to compensate for differing loads carried by the trailer 100 and for operation of the trailer 100 over different types of surfaces. For example, softer surfaces such as sand, mud or gravel, will require greater load compensation than will paved surfaces. Similarly, additional load compensation will usually be required when the trailer 100 carries larger loads.

Such variation of load compensation is accomplished by adjustment of the pressure regulator 130 by the vehicle operator to change the discharge pressure of the pump 120. If the operator of the command vehicle 10 detects drag caused by the trailer 100, for example, the discharge pressure of the pump 120 may be increased by adjustment of the pressure regulator 130, which results in increased torque output by the motors 288 and 290 and a corresponding increase in the load compensation provided by the trailer 100. Similarly, the pressure regulator 130 may be used to decrease the discharge pressure of the pump 120 to cause a corresponding decrease in the load compensation of the trailer 100 of the operator detects that the command vehicle 10 is being driven or pushed by the trailer 100. Avoidance of the latter instance is particularly desirable in eliminating a dange of a "jack knife" of the command vehicle 10 and the trailer 100 during turning and/or braking.

If the discharge pressure of the pump 120 is increased by the vehicle operator above 3,000 psi, the motors 288 and 290 will automatically adjust to maximum displacement, thereby providing additional torque and a corresponding increase in the load compensation of the trailer 100. In this event, the displacement of the pump 120 will automatically increase to maintain the discharge pressure set by the pressure regulator 130. Such an increase in the displacement of the pump 120 will increase the flow of hydraulic fluid to the trailer 100 to maintain the speeds of the motors 288 and 290 relatively constant.

Pressurized hydraulic fluid is also supplied to the trailer 100 from line 274 (shown in FIG. 2A) of the command vehicle 10 via line 328. The pressurized hydraulic fluid in line 328 is distributed by a manifold 340 to lines 342, 344 and 346. Lines 342 services various auxiliary devices included in the trailer 100, including a hydraulic crane and stabilizing jacks, for example. The lines 344 and 346 service the control components 350R and 350L of the right and left cylinder assemblies 20', respectively, of the trailer 100.

The control assemblies 350R and 350L include components which are substantially identical in construction and function to the components of the suspension assembly control 360R and 360L of the command vehicle 10. The control assemblies 350R and 350L selectively apply pressurized hydraulic fluid from lines 344 and 346 to the suspension assemblies 20' of the trailer 100 to independently control actuation of each of the piston rods 76'. The piston rods 76' may be actuated to adjust the height of the trailer 100 or to vary the load supported by each of the wheel members 12' of the trailer 100. During actuation of the piston rods 76', hydraulic fluid is discharged from the control assemblies 350R and 350L through drain lines 352 and 354. The drain line 452, in turn, discharges directly into a discharge manifold 356. The drain line 354 discharges first into the drain line 304, which directs such fluid to the discharge manifold 356. The fluid discharged by other auxiliary devices of the trailer 100 is also returned to the discharge manifold 356 via a line 358. Fluid collected by the discharge manifold 356 is directed back to the command vehicle 10 via a line 362 and finally to the fluid reservoir of the command vehicle 10 through a drain line 364 (shown in FIG. 2a) within the vehicle 10.

Figure 3A:
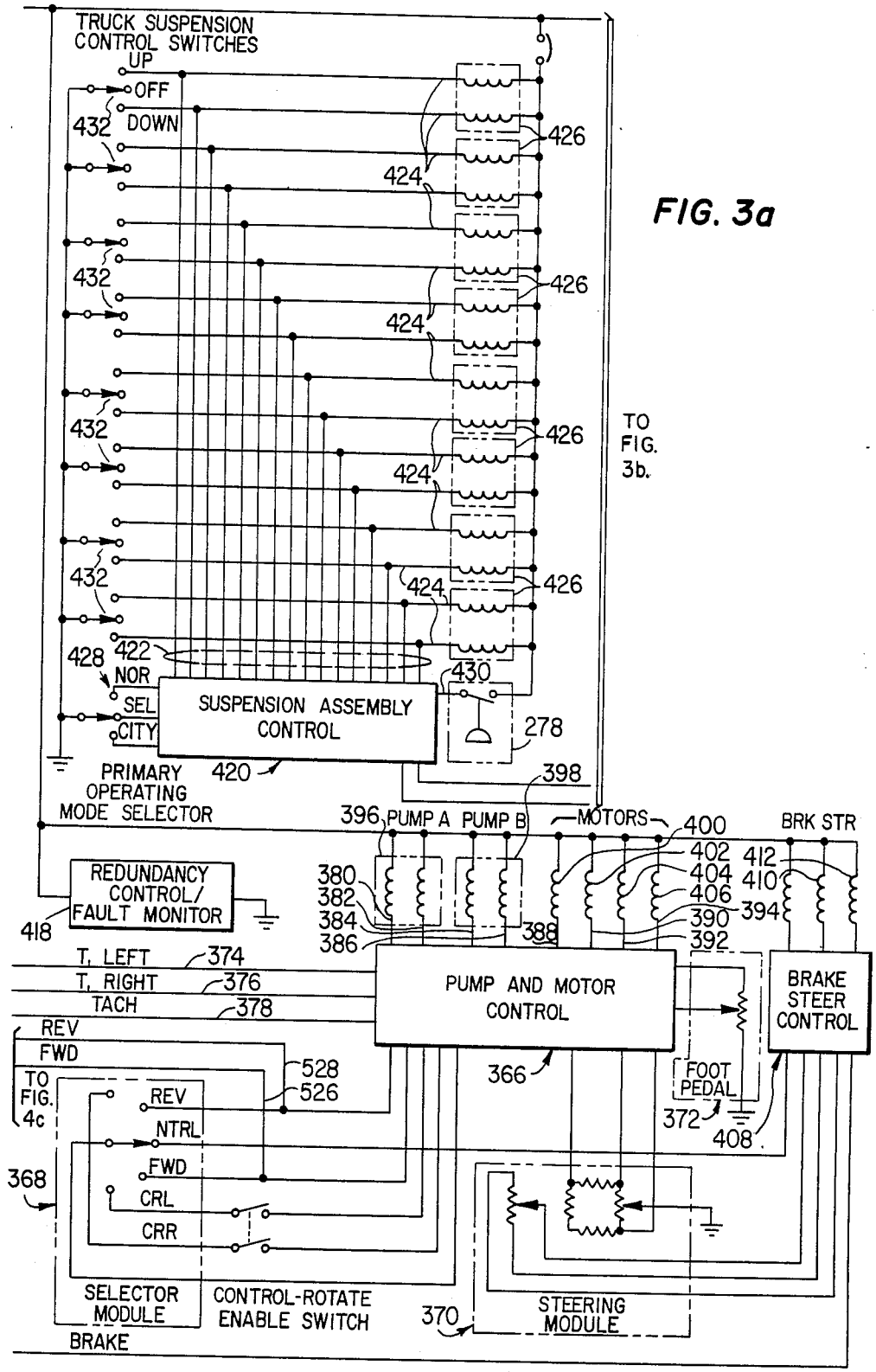
FIG. 3a is a schematic illustration of a first portion of the electrical control system of the present invention.
Figure 3B:
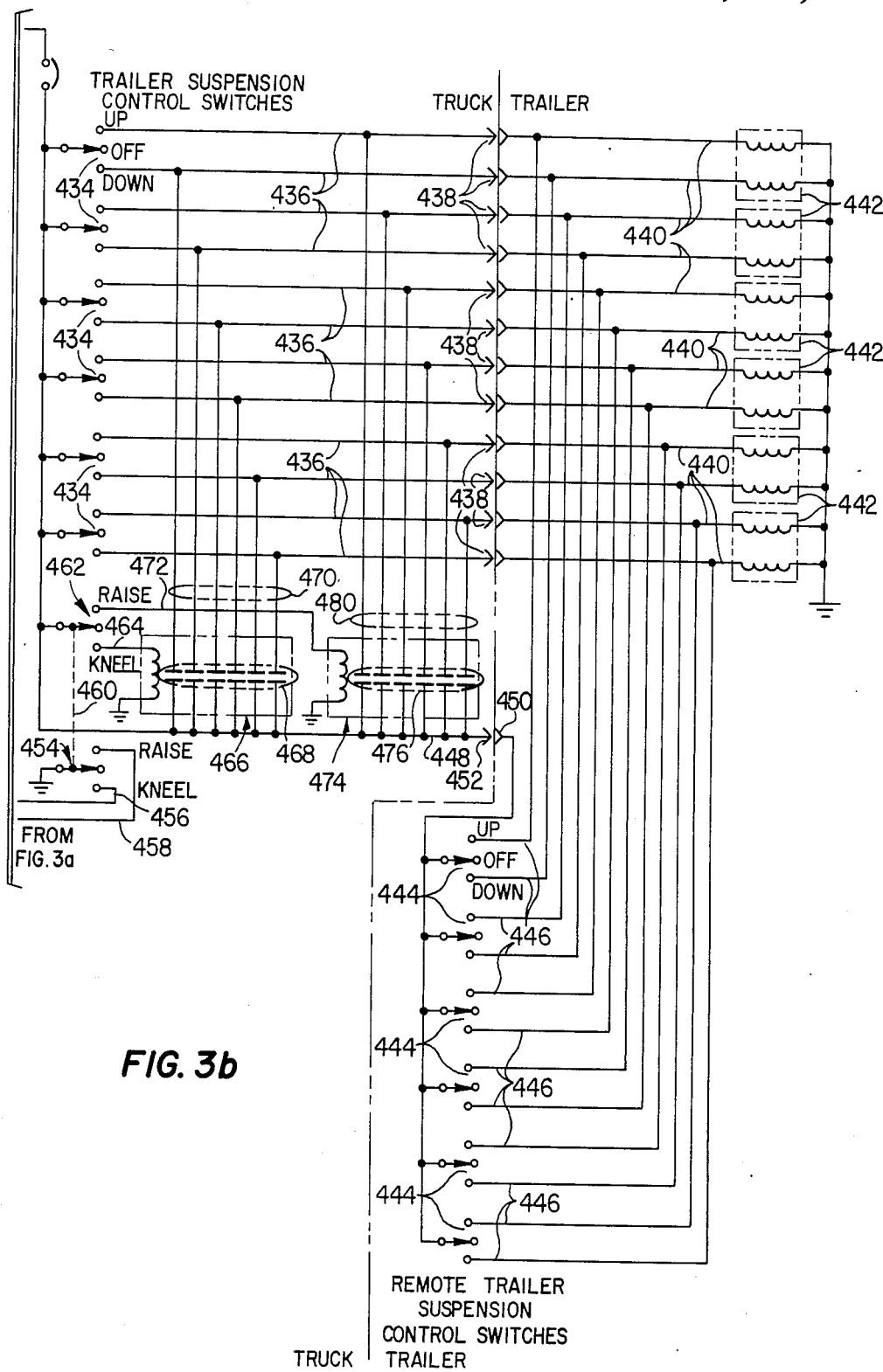
FIG. 3b is a schematic illustration of a second portion of the electrical control system of the present invention.

FIGS. 3a and 3b schematically illustrate the electrical control components of the command vehicle 10 and the trailer 100. The portion of the control system illustrated in FIG. 3a is utilized to control the braking, steering, power output and positioning of the wheel members 12 of the command vehicle 10 and is substantially identical in construction, function, and operation to the control system disclosed by co-pending application Ser. No. 747,669, particularly in FIGS. 20, 21a and 21b thereof, which disclosure is incorporated herein by reference.

Accordingly, the pump and motor control 366 controls the hydrostatic drive systems associated with each side of the command vehicle 10 in response to input received from the vehicle operator. Specifically, the pump and motor control 366 receives input from a selector module 368, a steering module 370 and a foot pedal 372 which are all located in the cab of the command vehicle 10. The pump and motor control 366 also monitors the speed of the motors 156 and 158 of the command vehicle 10 (shown in FIG. 2a) via a line 374 and the speed of the motors 170 and 172 (shown in FIG. 2a) via a line 376, and monitors the speed of the prime mover 122 (shown in FIG. 2a) via a line 378. It will be apparent that the motors 156 and 158 will operate at the same speed, as will the motors 170 and 172, since each pair of motors drives a common transmission. Therefore, the pump and motor control 366 need only monitor the speed of one of the motors on each side of the command vehicle 10.

The pump and motor control 366 controls the operation of the hydrostatic drive system on each side of the command vehicle 10 via lines 380, 382, 384, 386, 388, 390, 392 and 394. Lines 380 and 382 are connected to the control solenoids 396 within the pump 154. In a similar fashion, the lines 388 and 390 connect the pump and motor control 366 to the control solenoids 400 and 402 of the motors 156 and 158 on one side of the command vehicle 10, while lines 392 and 394 connect the pump and motor control 366 to the control solenoids 404 and 406 of the pumps 170 and 172 associated with the other side of the vehicle 10. The pump and motor control 366 controls the operation of the pumps 154 and 156 and the motors 156, 158, 170 and 172 in a manner substantially identical to that disclosed in co-pending application Ser. No. 747,669. Although the vehicle disclosed in such application utilize only one motor to drive each side of the vehicle, the pump and motor control 366 differs only in that it adjusts the displacement of the motors 156 and 158 on one side of the vehicle 10 simultaneously and to the same extent and adjusts the displacement of the motors 170 and 172 on the other side of the vehicle 10 simultaneously and to the same extent.

The control system of the command vehicle 10 also includes a brake steer control 408 which is substantially identical in construction and function to the brake steer control disclosed in co-pending application Ser. No. 747,669. Accordingly, the brake steer control 408 actuates the brake solenoids 410 and 412 via lines 414 and 416 in the manner described in application Ser. No. 747,669 in response to actuation of the selector module 368, the steering module 370, and the foot pedal 372 by the vehicle operator. The brake solenoids 410 and 412 each service the brakes on opposing sides of the command vehicle 10. Actuation of the solenoids 410 and 412 by the brake steer control 408 facilitates steering of the command vehicle 10 during braking.

A redundancy control/fault monitor 418 is included in the control system of the command vehicle 10 and is substantially identical in construction and function to the redundancy control and fault monitor disclosed in application Ser. No. 747,669. The redundancy control/fault monitor 418 serves to detect certain adverse conditions in the control of the pumps and motors of the hydrostatic drive system of the command vehicle 10. Upon sensing such adverse control conditions, the redundancy control/fault monitor 418 disengages operation of the pump and motor control 366 and engages a substantially identical controller.

The command vehicle 10 includes a suspension assembly control comprising electrical circuitry which controls the operation of the components comprising the suspension assembly controls 360R and 360L of the command vehicle 10. The construction and function of the suspension assembly control 420 is substantially identical to the suspension assembly control 468 of the vehicle disclosed in application Ser. No. 747,669.

The suspension assembly control 420 controls actuation of the piston rod 76 on each side of the command vehicle 10 via lines 422. The lines 422 are electrically connected by lines 424 to the control solenoids 426 of the cylinder assembly controls 360R and 360L of the command vehicle 10. The control solenoids 426 each actuate two-position valves (not shown) to control actuation of one of the piston rods 76 of the command vehicle 10. Actuation of the control solenoids 426 by the suspension assembly control 420 is in response to commands received from a primary operating mode selector 428 mounted within the cab of the command vehicle 10. The selector 428 is substantially identical in construction and function to the selector 470 utilized in the vehicle disclosed in application Ser. No. 747,669. The suspension assembly control 420 adjusts the position of the piston rod 76 of the command vehicle 10 in approximately equivalent incremental lengths in sequence about the vehicle until desired positions are reached. The sequence is initiated with the forwardmost of the wheel members 12 to be actuated, first actuating the piston rod of the cylinder assembly 20 on one side of the vehicle 10 and then actuating the piston rod of the cylinder assembly 20 on the opposing side of the vehicle 10. This process is repeated for the cylinder assembly 20 of the next rearward pair of wheel members 12, and so on, until the piston rods 76 of all of the cylinder assemblies 20 to be adjusted have been moved an incremental distance. This cycle is repeated until the piston rods of all of the wheel members to be adjusted have been properly positioned. The pressure switch 278 (also shown in FIG. 2a) signals the suspension assembly control 420 that the particular piston rods to be adjusted has moved and has not yet been fully extended or retracted by applying an electrical signal to the suspension assembly control 420 via a line 430.

The control system of the command vehicle 10 allows individual actuation of the piston rod 76 by means of an array of control switches mounted on a control panel within the cab of the vehicle 10. The switches 432 may be actuated from the position shown in FIG. 3a into contact with one of the two lines 424 servicing the control solenoids 426 of the suspension assembly controls 360R and 360L. The alternate positions of the switches 432 will extend and retract the piston rods with which they are associated to raise, lower or adjust the load supported by each of the wheel members 12.

FIG. 3b schematically illustrates the electrical system for controlling actuation of the piston rods 76 of the trailer 100. An array of switches 434 is mounted on a panel within the cab of the command vehicle 10. The switches 434 are preferably of the same type as the switches 432 and may each be displaced into contact with one of two lines 436 associated therewith. The lines 436 comprise an electrical bus which may be connected by a suitable couplings 438 to an electrical bus mounted on the trailer 100 comprising lines 440. The bus comprising lines 440 is preferably included in the linkage assembly 110 (shown in FIGS. 1a and 1b) utilized to interconnect the hydraulic and electrical systems of the command vehicle 10 and the trailer 100.

When coupled together, the lines 436 and 440 establish electrical connection between the switches 434 within the cab of the command vehicle 10 and control solenoids 442 of the suspension assembly controls 350R and 350L of the trailer 100. Each pair of solenoids 442 actuates two-position valves of the suspension assembly controls 350R and 350L to extend and retract the piston rods 76' of the trailer 100. Thus, each of the switches 434 can be displaced into one of two alternate positions, establishing contact with the lines 436 with which it is associated, to extend and retract a corresponding piston rod 76' of the trailer 100. In this manner, each of the piston rods 76' of the trailer 100 may be controlled individually by the operator of the command vehicle 10.

An array of switches 444 is also mounted on a control panel located on the trailer 100 to control actuation of the piston rods 76 individually. The switches 444 are similar to the switches 432 and 434 previously discussed. Each of the switches 444 is electrically connected by lines 446 and 440 to a corresponding pair of control solenoids 442. Displacement of the switches 444 between their two alternate positions will extend and retract its corresponding piston rods 76'. Electrical power is supplied to the switches 444 mounted on the trailer 100 by lines 448 and 450 which are electrically connected by a coupling 452 when the linkage assembly 110 (shown in FIGS. 1a and 1b) is connected to the command vehicle 10.

A master suspension control switch 454 is mounted within the cab of the command vehicle 10 to allow simultaneous actuation of the piston rods 76 of the vehicle 10 and piston rods 76' of the trailer 100. The master control switch 454 preferably comprises a toggle switch which is normally positioned as shown in FIG. 3b. The master control switch 454 can be displaced in either of two alternate positions to contact either line 456 or 458. Lines 456 and 458 are electrically connected to the suspension assembly control 420 shown in FIG. 3a. When positioned in contact with line 458, the master control switch 455 applies an electrical signal to the suspension assembly control 420 via the line 458. The suspension assembly control 420, in turn, simultaneously retracts all of the piston rods 76 to raise the command vehicle 10. Conversely, displacement of the master control switch 454 in contact with the line 456 applies an electrical signal to the suspension assembly control 420, resulting in simultaneous extension of all of the piston rods 76 to lower the command vehicle 10.

Displacement of the master control switch 454 also results in a corresponding actuation of the piston rods 76' of the trailer 100. The master control switch 454 is connected by a mechanical linkage 460 to a control switch 462 which controls simultaneous actuation of all of the piston rods 76' of the trailer 100. As the master control switch 454 is displaced into contact with the line 456 to raise the command vehicle 10, the control switch 462 is displaced by the mechanical linkage 460 into contact with a line 464. As the control switch 462 contacts the line 464, an electrical relay 466 is energized, which closes an array of contacts 468. As the electrical contacts 468 close, an electrical signal is applied to the control solenoids 442 via lines 470, 436 and 440 to extend the piston rod 76' to lower the trailer 100.

Similarly, the mechanical linkage 460 displaces the control switch 462 into contact with a line 472 when the master control switch 454 is displaced into contact with the line 458 to raise the command vehicle 10. Contact of the switch 462 with the line 472 energizes a relay 474, closing an array of electrical contacts 476. When the electrical contacts 476 are closed, electrical power is supplied to the control solenoids 442 via lines 478 to simultaneously retract all of the piston rods 76' of the trailer 100.

Figure 3C:
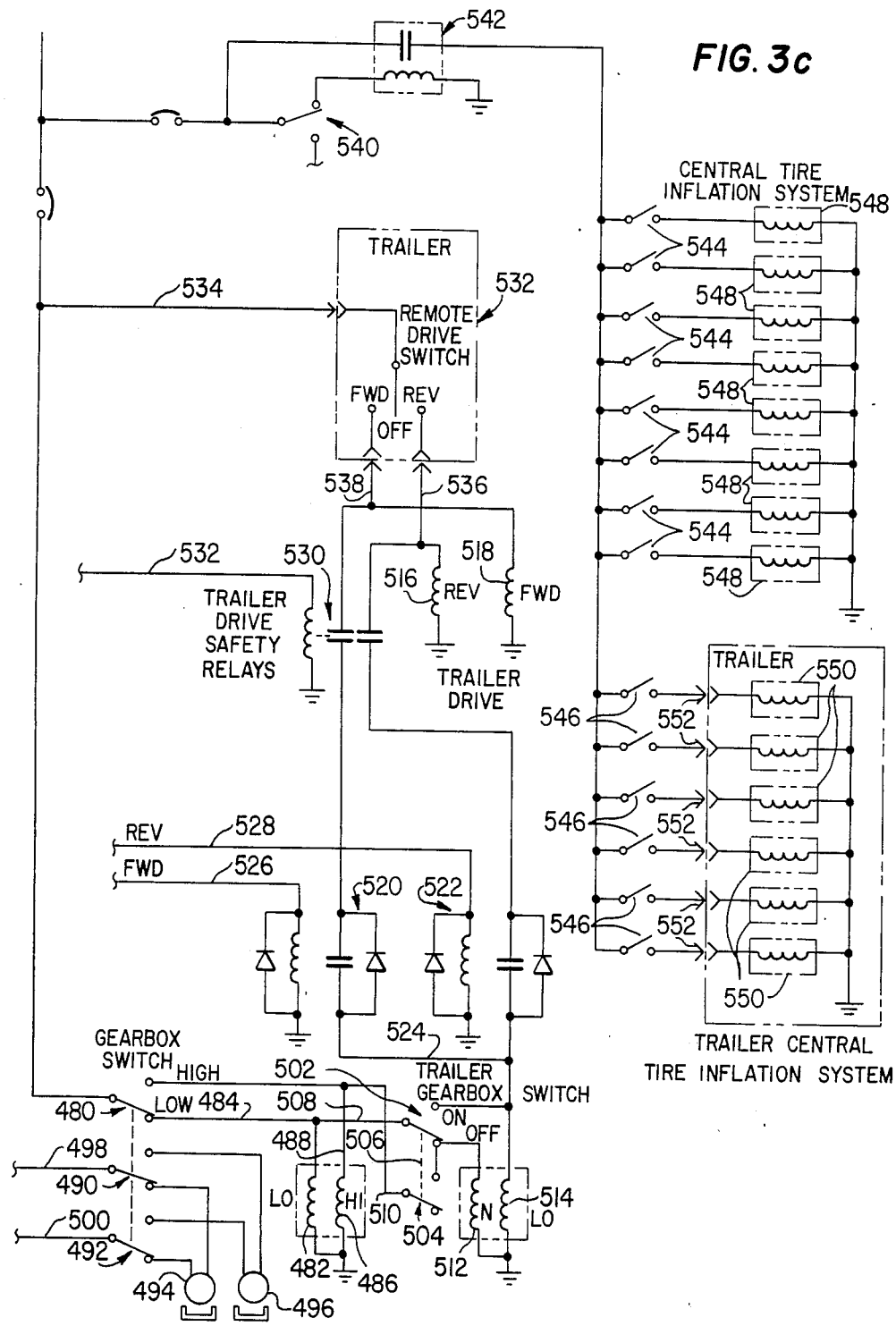
FIG. 3c is a schematic illustration of a third portion of the electrical control system of the present invention.

FIG. 3c schematically illustrates that portion of the control system of the command vehicle 10 and the trailer 100 relating to control of the pump 120 which services the trailer 100, control of the gear boxes 306 and 308 of the trailer transmission, and control of the tire inflation system of both the command vehicle 10 and the trailer. Specifically, a two-position gear box switch 480 is mounted within the cab of the command vehicle 110 for switching the gear boxes 250 through 256 of the command vehicle 10 between high and low speeds. When positioned as shown in FIG. 3c, the switch 480 applies an electrical signal to the low speed control solenoid (only one of which is shown) of each of the gear boxes 250 through 256 via a line 484 to shift the gear boxes to low speed. Similarly, displacement of the switch 480 to its alternate position will apply an electrical signal to the high speed control solenoid 486 (only one shown) of each of the gear boxes 250 through 256 via a line 488 to shift the gear boxes into high speed. The switch 480 is mechanically coupled to a pair of switches 490 and 492. The switches 490 and 492 alternate electrical connection of a speedometer (not shown) mounted within the cab of the command vehicle 10 between the pair of speed sensors 494 and 496 which sense the speed of the vehicle 10. The speed sensors 494 and 496 are mechanically connected to the transmission of the command vehicle 10 between one of the motors of the command vehicle 10 and its associated gear box. Therefore, the speed sensors 494 and 496 are calibrated differently to compensate for a variation in the transmission speed versus the speed of the command vehicle 10 when the gear boxes 250 through 256 are switched between high and low speed to provide a true reading of the speed of the vehicle 10.

Accordingly, when the gear box switch 480 is in the position shown in FIG. 3c, the switches 490 and 492 electrically connect the speed sensor 494 to a suitable speed indicator mounted within the cab of the command vehicle 10 via lines 498 and 500. As the command vehicle 10 is switched into high gear by displacement of the gear box switch 480 from the position shown in FIG. 3c, switches 490 and 492 electrically connect the alternate speed sensor 496 to the speed indicater of the vehicle 10, thus compensating for variation in the transmission speed of the vehicle 10.

The gear boxes 306 and 308 of the trailer 100 are switched between low speed and neutral by actuation of switches 502 and 504 mounted within the cab of the command vehicle 10. The switches 502 and 504 are connected by a mechanical link 506 for simultaneous actuation. The switches 502 and 504 are electrically connected to the gear box switch 480 via lines 508 and 510, respectively.

The electrical connection of the trailer gear box switches 502 and 504 to the gear box switch 480 of the command vehicle 10 as shown insures that the gear boxes 306 and 308 of the trailer are in neutral when the switch 502 is in its off position and whenever the gear boxes of the command vehicle 10 are in high speed. For example, when the gear box switches 480, 502 and 504 are positioned as shown in FIG. 3c, the neutral control solenoid 512 (only one of which is shown) of each of the gear boxes 306 and 308 of the trailer 100 are energized, switching the gear boxes to their neutral positions. When the switch 502 is displaced to its on position, the speed control solenoids 514 (only one of which is shown) of the gear boxes 306 and 308 is energized and the low speed solenoids 512 are deenergized, shifting the trailer 100 into low speed. At this point, displacement of the gear box switch 480 of the command vehicle 10 to its high speed position deenergizes the low speed solenoids 514 of the trailer gear boxes and energizes the neutral solenoid 512 thereof via the gear box switch 504, shifting the trailer to neutral. This feature substantially reduces the danger of "jack-knifing" of the command vehicle in the trailer 100 during a high speed operation. Actuation of the pump 120 which drives the motors 288 and 290 of the trailer 100 is accomplished by energizing either of the reverse or forward solenoids 516 and 518 of the control valve 132. Energizing the reverse solenoid 516 actuates the control valve 132 to direct operation of the pump 120 in reverse, while energizing the forward solenoid 518 actuates the valve 132 to direct operation of the pump 120 in the forward direction.

Under normal conditions, the gear box switch 502 of the trailer 100 must be in its "on" position before either of the reverse or forward solenoids 516 and 518 can be energized. However, the gear box switch 480 of the command vehicle 10 must also be in its low speed position to provide the supply of electrical power to the switch 502. If these two conditions are met, electrical power is supplied to the forward and reverse relays 520 and 522 via a line 524.

The forward and reverse relays 520 and 522 are actuated by the selector module 368 (shown in FIG. 3a) of the command vehicle 10 via lines 526 and 528, respectively. Actuation of the relays 520 and 522 will supply electrical power to the forward and reverse solenoids 518 and 516 through a trailer drive safety relay 530. The safety relay 530 will allow the flow of electrical power to the solenoids 516 and 518 only upon depression of the foot pedal 372 (shown in FIG. 3a) by the command vehicle operator. The relay 530 is energized via a line 532 connected to a micro-switch (not shown) associated with the foot pedal 372. The foregoing arrangement prevents actuation of the pumps 288 and 290 of the trailer 100 unless the command vehicle 10 is operated at low speed in its forward or reverse operating modes.

However, the foregoing safety circuitry may be bypassed by the operator by utilization of a remote drive switch 532 mounted on the trailer 100. Power supplied to the remote drive switch 532 from the command vehicle 10 via a line 534 when the linkage assembly 110 (shown in FIGS. 1a and 1b) is connected to the vehicle 10. The remote drive switch 532 is positionable to supply electrical power directly to the reverse and forward drive solenoids 516 and 518 via lines 536 and 538, respectively. The switch 532 may be used to mometarily power the trailer 100 to facilitate hitching and unhitching of the trailer 100 to and from the command vehicle 10.

The command vehicle 10 and the trailer 100 include central tire inflation systems to control the pressure within the tires of each of the wheel members 12 and 12' thereof. The central tire inflation systems of the command vehicle 10 and the trailer 100 are substantially identical in construction, function and operation to the central tire inflation system disclosed in application Ser. No. 747,669, which disclosure is incorporated herein by reference.

The electrical system controlling the actuation of the central tire inflation systems is disclosed in FIG. 3c. A switch 540 is provided within the cab of the command vehicle 10 for actuation by the vehicle operator to energize a power relay 542. When energized, the relay 542 supplies electrical power to an array of switches 544 and an array of switches 546 mounted within the cab of the command vehicle 10. The switches 544 are electrically connected to the control solenoids of the control valves associated with each of the wheel members 12 of the command vehicle 10. Closure of each of the switches 544 energizes its associated control solenoid 548. This in turn actuates the control valve associated with the solenoid to allow variation of the air pressure within the tire serviced by the valve. Similarly, the switches 546 may be closed individually to energize the control solenoids 550 in the central tire inflation system of the trailer 100. This allows individual adjustment of the pressure of the tire associated with each switch 546. The switches 546 are electrically connected to the control solenoids 550 by means of couplings 552 when the linkage assembly 110 (shown in FIGS. 1a and 1b) is connected to the command vehicle 10.

OPERATION

Utilization of the trailer 100 of the present invention begins with the connection thereof to the command vehicle 10. The command vehicle 10 is initially maneuvered to position the rear of the vehicle 10 adjacent to the tongue 102 and control linkage 110 of the trailer 100. The tongue 102 and the control linkage 110 are connected to the command vehicle 10 to allow towing of the trailer 100 and to form electrical, hydraulic and pneumatic connections between the command vehicle 10 and the trailer 100. If necessary or desirable, the switch 532 (shown in FIG. 3c) may be utilized to manipulate the trailer 100 independently of the command vehicle 10 to facilitate the connection of the trailer tongue 102 to the command vehicle 10.

After the trailer 100 is properly connected to the command vehicle 10 the trailer 100 is operated from the command vehicle 10. Operation of the combined apparatus comprising the command vehicle 10 and the trailer 100 normally begins with the switches 480 and 502 positioned as shown in FIG. 3c and with the selector module 368 (shown in FIG. 3a) in the forward operating mode, thereby placing the gear boxes 250, 252, 254 and 256 of the command vehicle 10 in the low speed condition and placing the gear boxes 306 and 308 of the trailer 100 in neutral. The switch 502 must be displaced to its alternate position to shift the gear boxes 306 and 308 of the trailer 100 into low speed. As the gear boxes 250 through 256 of the command vehicle 10 are shifted into high gear, the gear boxes 306 and 308 of the trailer 100 return to the neutral position, thereby preventing jack-knifing of the trailer 100 relative to the command vehicle 10 during high speed operation. The pressure regulator 130 of the command vehicle 10 may be adjusted by the operator to stabilize the speed of operation of the trailer 100 at a speed which is consistent with that of the command vehicle 10. In this manner the drag which would otherwise be imposed on the command vehicle 10 by the trailer 100 is reduced or completely eliminated, thereby facilitating movement of the combined apparatus over various types of terrain.

Although preferred embodiments of the invention have been illustrated in the accompanying Drawings and have been described in the foregoing Detailed Description, it will be understood that the invention is not limited to the embodiments disclosed, but is capable of numerous rearrangements, modifications and substitution of parts and elements without departing from the spirit of the invention.

We claim:

1. A system for powering a trailer comprising:
a trailer frame;
means for connecting the trailer frame to a towing vehicle;
at least one wheel member rotatably mounted on each of opposing sides of the trailer frame for supporting and driving the trailer frame;
at least two hydraulic motors, each for driving at least one wheel member of one of the opposing sides of the trailer frame;
means for supplying pressurized hydraulic fluid from the towing vehicle to the hydraulic motors; and
wherein the hydraulic fluid supply means directs pressurized hydraulic fluid to the hydraulic motors in parallel and without controllinig the flow rate of fluid to the motors, to facilitate turning the trailer by allowing variation of the flow rate of fluid to the motors and their corresponding speed during a turn while allowing the motors to provide substantially equal torque to the wheel members.

2. The system according to claim 1 wherein the hydraulic motors are two-position variable displacement motors which increase in displacement when the pressure of hydraulic fluid supplied thereto exceeds a predetermined set point and which decrease in displacement when the pressure of the hydraulic fluid supplied thereto deceases below a predetermined set point.

3. The system according to claim 1 further comprising a source of pressurized hydraulic fluid mounted on the towing vehicle including a variable displacement hydraulic pump and means for varying the displacement of the pump to maintain the hydraulic fluid supplied to the hydraulic motor at a relatively constant predetermined pressure.

4. The system according to claim 3 wherein the source of pressurized hydraulic fluid further includes means for varying the pressure at which the hydraulic fluid is supplied to the hydraulic motor by the variable displacement hydraulic pump.

5. The system according to claim 1 further comprising wheel member positioning means for selectively varying the vertical position of the wheel members relative to the trailer frame.

6. A system for powering a trailer comprising: a trailer frame;
at least one wheel member rotatably mounted on opposing sides of the frame;
at least two hydraulic motors mounted on the trailer frame for driving one or more wheel members on opposing sides of the frame; and
hydraulic pump means for supplying pressurized hydraulic fluid to the hydraulic motors, including means supplying hydraulic fluid to the motors in parallel from a common hydraulic fluid supply line without controlling the flow rate of fluid to the motors, to facilitate turning the trailer by allowing variation of the flow rate of fluid to the motors at their corresponding speed during a turn while allowing the motors to provide substantially equal torque to the wheel members, such that during movement through a turn, the speed of the hydraulic motor driving the wheel members on the inside of the turn will decrease and the speed of the wheel members on the outside of the turn will automatically increase, causing an inverse variance in the speed of the driven wheel members on opposing sides of the trailer frame.

7. The system according to claim 6 wherein the hydraulic pump means includes a variable displacement pump and displacement control means varying the displacement of the pump to substantially maintain the pressure of hydraulic fluid supplied to the hydraulic motors at a relatively constant predetermined level.

8. The system according to claim 7 further including means for varying the predetermined pressure level at which the displacement control means maintains the pressure of hydraulic fluid supplied to the hydraulic motors.

9. The system according to claim 8 further comprising a command vehicle engageable with the trailer frame and wherein the hydraulic pump means includes a variable displacement hydraulic pump mounted on the command vehicle, and displacement control means mounted on the command vehicle for varying the displacement hydraulic pump to maintain the pressure of hydraulic fluid supplied to the hydraulic motors at a predetermined level, said displacement control means being adjustable to vary the pressure at which hydraulic fluid supplied to the hydraulic motors is maintained.

10. The system according to claim 9 wherein the wheel members include pneumatic tires for supporting the vehicle on an underlying surface and tire pressure control means for varying the pressure within the pneumatic tires while the trailer is in operation.

11. The system according to claim 10 further comprising drive means for driving the command vehicle, the command vehicle drive means being controlled independently of the hydraulic motors and pumps driving the trailer.

12. A system for powering a trailer comprising:

a trailer frame;
at least one wheel member rotatably mounted on opposing sides of the frame;
at least two hydraulic motors mounted on the trailer frame for driving one or more wheel members on opposing sides of the frame; and
hydraulic pump means for supplying pressurized hydraulic fluid to the hydraulic motors, including a variable displacement pump and displacement control means varying the displacement of the pump to substantially maintain the pressure of hydraulic fluids supplied to the hydraulic motors at a relatively constant predetermined level to maintain the torque output of the hydraulic motors relatively constant.

* * * * *